Nov. 29, 1960   R. S. HAYES, JR., ET AL   2,962,116
APPARATUS FOR TREATING AIR
Filed March 17, 1958
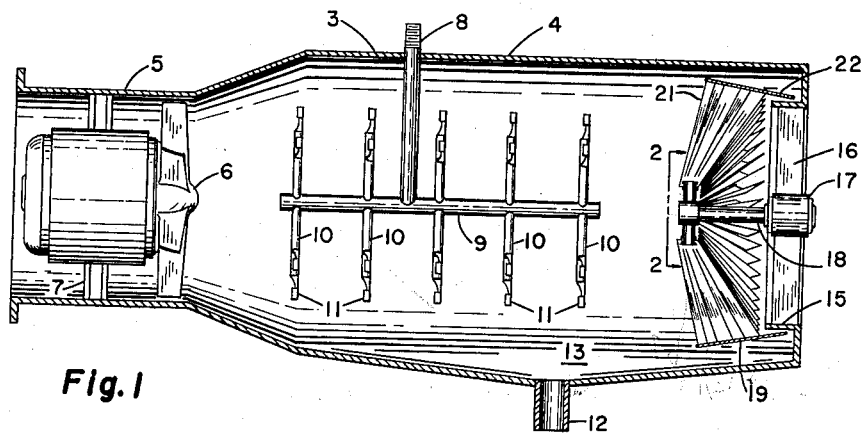
Fig. 1
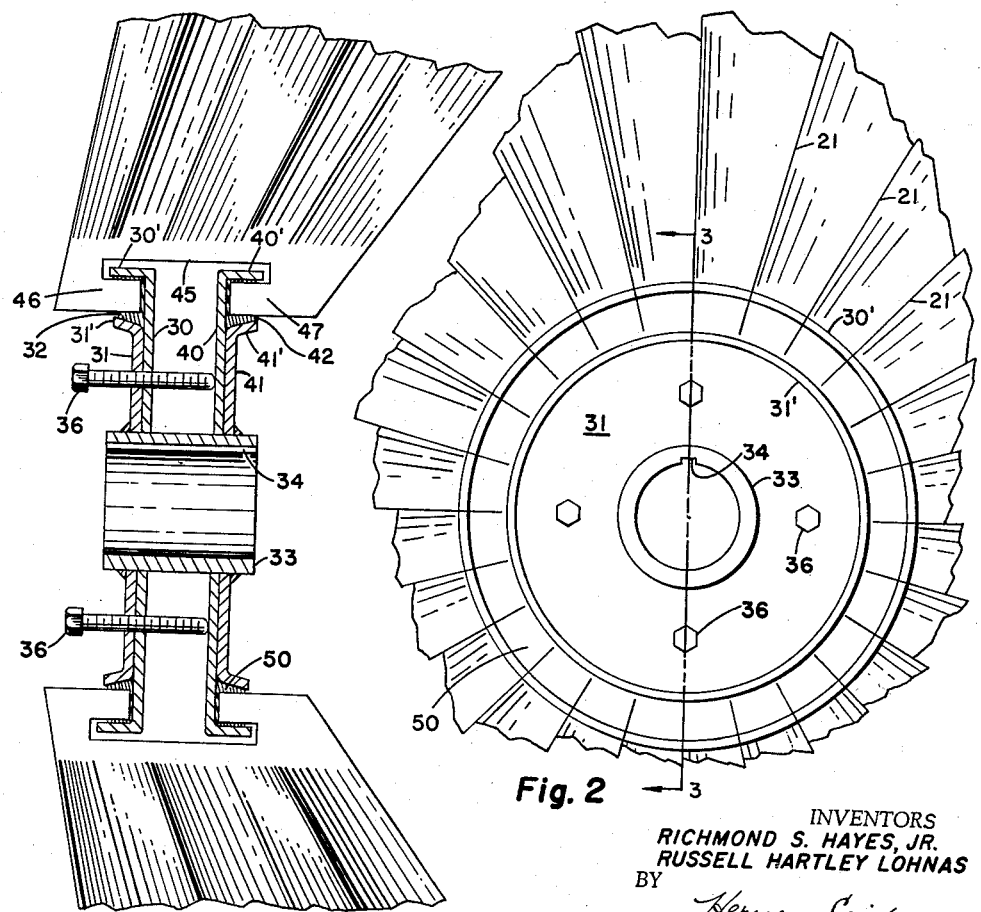
Fig. 2
Fig. 3
INVENTORS
RICHMOND S. HAYES, JR.
RUSSELL HARTLEY LOHNAS
BY
*Herman Seid*
ATTORNEY United States Patent Office 2,962,116
Patented Nov. 29, 1960

2,962,116

APPARATUS FOR TREATING AIR

Richmond S. Hayes, Jr., Dewitt, and Russell Hartley Lohnas, Minoa, N.Y., assignors to Carrier Corporation, Syracuse, N.Y., a corporation of Delaware Filed Mar. 17, 1958, Ser. No. 721,789

5 Claims. (Cl. 183—22)

This invention relates to an apparatus for treating air, and, more particularly, to an apparatus for treating air of the type generally used in air conditioning and air washing systems, wherein a rotating eliminator removes water particles from an air stream. This invention also relates to a method for fabricating an eliminator structure.

In the co-pending application of Ernest C. Hungate entitled, "Apparatus for Treating Air," Serial No. 575,560, filed April 2, 1956, now Patent No. 2,932,360, granted April 12, 1960, there is disclosed an apparatus for treating air which wholly departs from previous concepts of apparatus of this type. In the above-mentioned application, the apparatus includes a casing having means for passing an air stream therethrough. Means are provided for placing the stream in direct contact with water, such means usually comprising a plurality of spray members capable of discharging finely divided particles of water into the air stream. A bladed rotor which functions as an eliminator is placed within the casing, usually adjacent the outlet, to remove entrained water particles from the discharge air stream. This eliminator may include a plurality of radially extending blades which have an annular enclosing means placed about the periphery of the bladed structure. These blades preferably are oriented in such a manner that the axial projections of the blades overlap.

The chief object of the present invention is to provide an improved apparatus for treating air.

A further object is to provide an improved eliminator structure for use in an apparatus for treating air.

Another object of the invention is to provide an improved and inexpensive bladed rotor construction.

A still further object of the invention is to provide a method for fabricating an improved bladed rotor. Other objects of the invention will be readily perceived from the following description.

This invention relates to an eliminator construction for use in an apparatus for treating air which comprises a bladed rotor having means defining a first annular trough, means defining a second annular trough, said first and second annular troughs being concentric, a plurality of radially extending blades having portions thereof extending into the first and second annular troughs and means for substantially filling the troughs to join the blades to the means defining the trough.

This invention also relates to a method for fabricating a bladed rotor for use as an eliminator in an apparatus for treating air, the steps which consist in attaching a first flanged disc to a second disc to thereby form a first annular trough, attaching the first and second flanged discs to a sleeve, attaching a third flanged disc to a fourth flanged disc to form a second annular trough, passing the third and fourth flanged discs on to the sleeve so that the first and second troughs are substantially concentric, placing a portion of each of a plurality of radially extending blades into the first trough, separating the third and fourth flanged discs from the first and second flanged discs so that a portion of each of the radially extending blades extends into the second trough, passing a material having a plastic consistency into the first trough to substantially fill the trough, permitting the material to harden, thereby connecting the blades to the first and second flanged discs and passing a material having a plastic consistency into the second trough, permitting the material to harden, thereby attaching the blades to the third and fourth flanged discs. "Plastic consistency" as used herein defines a quality of being sufficiently pliable for the material to assume the shape of its container.

The attached drawings illustrate a preferred embodiment of the invention in which:

Figure 1 is a sectional view of the apparatus of the present invention;

Figure 2 is an enlarged fragmentary sectional view of the eliminator of the apparatus taken along the lines 2—2 of Figure 1; and Figure 3 is a sectional view of the eliminator taken along the lines 3—3 of Figure 2.

Referring to the drawing, there is shown in Figure 1, an apparatus for treating air embodying the present invention. The apparatus includes a casing 3 which consists of a main section 4 and an inlet section 5, which is of a smaller diameter than the main section 4. Fan 6 is located in the inlet section and is mounted therein by means of suitable struts 7.

A water supply line 8 extends through the main section 4 and is connected to the supply header 9 which extends longitudinally within the main section 4. A plurality of banks of lines 10 extend from the supply head 9. Suitable nozzles 11 are located at the extremities of the individual lines 10. Drain 12 is located in the bottom portion of the main section 4 to remove water from the sump 13 of the unit.

At the end of the main section 4 is located an exit portion 15, wherein is mounted a suitable bearing 17. This bearing 17 is mounted by means of suitable struts 16. A shaft 18 is journalled within the bearing 17. Mounted on the shaft 18 is the bladed rotor 19, which is the eliminating device of the present apparatus.

This eliminator comprises a plurality of radially extending blades 21 which are attached to a frusto-conical shaped enclosing means 22.

Referring to Figures 2 and 3, the means for attaching the blades to the shaft 18 includes a first flanged disc 30, which is of a greater diameter than a second flanged disc 31. The flanged discs 30 and 31 may be spot welded to one another, thereby defining a first annular trough 32 between the flanges 30' and 31' of the discs 30 and 31 respectively.

The first flanged disc is attached to a sleeve 33 which has a suitable key slot 34 adapted for mounting the sleeve on the shaft 18. The first and second flanged discs have extending therethrough a threaded opening adapted to threadably engage the jack bolts 36.

A third flanged disc 40 being of a larger diameter than a fourth flanged disc 41, is suitably attached thereto to define a second trough 42. The second trough is defined by the flanges 40' and 41' of the flanged discs 40 and 41.

The eliminator comprises a plurality of blades 21, each blade has one or more bends. These blades cooperate with the surfaces of adjacent blades to define a plurality of zig-zag passages through the bladed structure in a manner more fully described in the previously mentioned co-pending application of Ernest C. Hungate. The end of the blade opposite the portion engaging the enclosing means 22 has provided therein a T slot 45 defining a first tab 46 and a second tab 47. These tabs are inserted in the first and second troughs and by means of a solder or plastic material such as a phenol formaldehyde resin having a suitable filler which is poured into the first and second troughs and permitted to harden therein, the blades are attached to the flanged discs thereby forming a unitary bladed rotor, which performs the eliminating function of the apparatus described in Figure 1. It is to be noted that the flanges 31' and 41' are frusto-conical in shape thereby giving the troughs a trapezoidal cross section. This trough shape insures that the solder or plastic will not leave the trough even if the bond to the discs is broken.

Considering the operation of the apparatus in Figure 1, air is induced through casing 3 by means of the fan 6. As the air stream passes through the casing, water is passed into the line 8 through the supply header 9 and is discharged through the nozzles 11, thereby filling the main section 4 of the casing with a fine spray of water. The humidity of the air and also the temperature of the air passing through the unit is affected by this relationship with the water spray. As the air passes through the exit portion of the casing, it will tend to carry undesirable entrained water particles.

To remove this entrained water from the air stream the eliminator structure 19 is provided. The bladed structure rotates and intercepts the water particles as it passes through zig-zag passages in the bladed structure and returns the water into the casing to be discharged through the drain 12. The operation of the apparatus in Figure 1 is more fully described in the previously mentioned copending application of Ernest C. Hungate, Serial No. 575,560, filed April 2, 1956.

Considering the fabrication of the bladed rotor comprising the eliminator of the apparatus, the first flanged disc 30 is spot welded to the second flanged disc 31, thereby defining the first annular trough 32. The first and second flanged discs are then welded to the sleeve 33. The third flanged disc 40 is spot welded to the fourth flanged disc 41, thereby defining the second annular trough 42. The third and fourth flanged discs are then slipped over the sleeve 33 so that the first and second annular troughs are substantially concentric and adjacent one another. The blades 21 are than radially extended and spaced by a suitable fixture, so that tabs 46 extend into the first annular trough. The jack bolts 36 are then placed in the threaded openings in the first and second flanged discs. The bolts are utilized to separate the third and fourth flanged discs from the first and second flanged discs so that the tabs 47 of the blades 21 extend into the second annular trough 42. At this point the third and fourth flanged discs are welded to the sleeve 33. The structure is then set up so that molten solder or a plastic material may be poured into the first annular trough, substantially filling this trough and thereby joining the blades set into this trough to the first and second flanged discs. The solder is permitted to harden and then the bladed structure is set up so that molten solder may be passed into the second annular trough, thereby filling the trough and joining the second tab 47 portion of each of the blades 21 with the third and fourth flanged discs. By these steps a single unitary eliminator structure is fabricated.

The present invention has been illustrated with particular reference for use in air treating apparatus. However, it is apparent that this type of structure may be utilized in other environments wherein it is desired to join radially extending blades or other members to a central hub section in an inexpensive and simple structure.

While we have described the preferred embodiment of our invention, it will be understood that the invention is not limited thereto since it may be otherwise embodied within the scope of the following claims.

We claim:

1. In an apparatus for treating air, the combination of a casing, means for passing an air stream through the casing, means for placing the air stream in contact with a water spray and a bladed eliminator for removing entrained water particles from the air stream, means for rotatably mounting said eliminator, said eliminator comprising a first flanged disc, a second flanged disc attached to the first flanged disc, said second flanged disc being smaller in diameter than said first flanged disc, thereby defining a first annular trough, a sleeve, means for attaching the first and second flanged discs to the sleeve, a third flanged disc, a fourth flanged disc being of smaller diameter than the third flanged disc and being attached thereto to form a second annular trough, said third and fourth flanged discs being attached to said sleeve, a plurality of radially extending blades having portions extending into said first and second troughs and means to substantially fill the troughs to connect the blades to the flanged discs.

2. An apparatus according to claim 1, wherein the eliminator further comprises means enclosing the periphery of the bladed structure.

3. A bladed rotor comprising a first flanged disc, a second flanged disc attached to the first flanged disc, said second flanged disc being smaller in diameter than said first flanged disc thereby defining a first annular trough, a sleeve, said first and second flanged discs being attached to the sleeve, a third flanged disc, a fourth flanged disc being of a smaller diameter than the third flanged disc and being attached thereto to form a second annular trough, said third and fourth flanged discs being attached to said sleeve, a plurality of radially extending blades having portions extending into said first and second troughs and means to substantially fill the troughs to connect the blades to the flanged discs to thereby form a unitary structure.

4. In a method for fabricating a bladed rotor, the steps which consist in attaching a first flanged disc to a second flanged disc to thereby form a first annular trough, securing the first and second flanged discs to a sleeve, attaching a third flanged disc to a fourth flanged disc to form a second annular trough, passing the third and fourth flanged discs onto the sleeve so that the first and second troughs are concentric and adjacent one another, placing a portion of each of a plurality of radially extending blades into the first trough, separating the attached third and fourth flanged discs from the first and second flanged discs so that a portion of each of the radially extending blades extends into the second trough, passing a material having a plastic consistency into the first trough to substantially fill the trough, permitting the material to harden, thereby connecting this portion of the blades to the first and second flanged discs and passing a material having a plastic consistency into the second trough, permitting the material to harden thereby attaching the portion of the blades to the third and fourth flanged discs.

5. A bladed rotor comprising means defining a first annular trough, means defining a second annular trough, said first and second annular troughs being concentric, a plurality of radially extending blades having portions thereof extending into the first and second troughs, the means defining each annular trough comprising two flanged discs fastened to one another and means for substantially filling the troughs to join the blades to the means defining the troughs to define a substantially unitary structure.

References Cited in the file of this patent
UNITED STATES PATENTS

| | | |
|---|---|---|
| 1,010,929 | Loetzer | Dec. 5, 1911 |
| 1,999,326 | Forsyth | Apr. 30, 1935 |
| 2,146,342 | Koyemann | Feb. 7, 1939 |
| 2,195,707 | Nutting | Apr. 2, 1940 |
| 2,240,873 | Thomas | May 6, 1941 |
| 2,587,417 | Vedder | Feb. 26, 1952 |
| 2,684,521 | Morrison | July 27, 1954 |
| 2,732,909 | Campbell | Jan. 31, 1956 |
| 2,835,960 | Rork | May 27, 1958 |
| 2,840,299 | Paetz | June 24, 1958 |